United States Patent [19]

Kimura et al.

[11] 4,123,761

[45] Oct. 31, 1978

[54] METHOD OF PURGING INK PASSAGES OF AN INK JET RECORDING DEVICE

[75] Inventors: Yoshiaki Kimura; Masanori Kawai; Takashi Hatano, all of Hachioji, Japan

[73] Assignee: Konishiroku Photo Industry Co., Ltd., Tokyo, Japan

[21] Appl. No.: 802,673

[22] Filed: Jun. 2, 1977

[30] Foreign Application Priority Data

Jun. 7, 1976 [JP] Japan .................................. 51-66894

[51] Int. Cl.[2] .............................................. G01D 15/18

[52] U.S. Cl. ....................................... 346/140 R; 346/1

[58] Field of Search ........................... 346/1, 75, 140 R

[56] References Cited

U.S. PATENT DOCUMENTS

| | | | |
|---|---|---|---|
| 3,832,579 | 8/1974 | Arndt | 346/140 R X |
| 3,925,788 | 12/1975 | Kashio | 346/75 |
| 3,925,789 | 12/1975 | Kashio | 346/75 |
| 3,974,508 | 8/1976 | Blumenthal | 346/140 R |
| 4,007,465 | 2/1977 | Chaudhary | 346/140 R |
| 4,038,667 | 7/1977 | Hou et al. | 346/140 R |
| 4,042,937 | 8/1977 | Perry et al. | 346/75 X |

*Primary Examiner*—George H. Miller, Jr.
*Attorney, Agent, or Firm*—Limbach, Limbach & Sutton

[57] ABSTRACT

A method of purging or cleaning ink passages of an ink jet recording device of the type in which a series of ink droplets is ejected from an orifice of a printing head towards a recording medium by the volume displacement of a pressure chamber provided in the printing head, including the steps of applying pressure required for purging to ink within an ink supply source, keeping a valve to open wide and forming a flow of ink in ink passages in one direction towards the orifice, thereby to remove bubbles and impurities present in the ink passages together with the discharged ink. Furthermore, in the present invention, there is provided a suction means associated with the ink jet recording device, which is used to obtain more excellent purging effect in combination with the above-mentioned steps.

14 Claims, 8 Drawing Figures

FIG. 7(a)
FIG. 7(c)
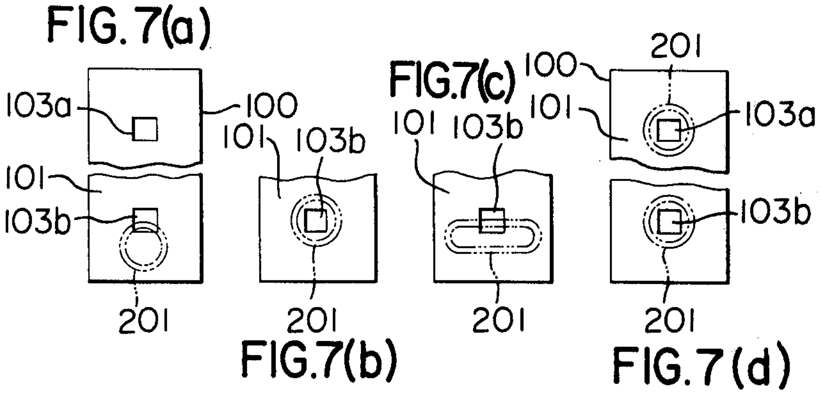
FIG. 7(b)
FIG. 7(d)
FIG. 8(a)
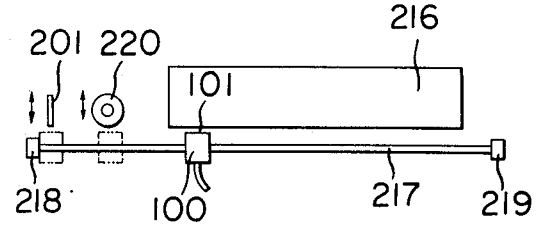
FIG. 8(b)
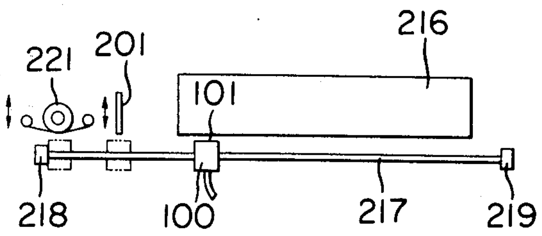
FIG. 8(c)
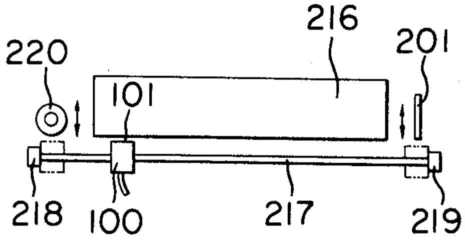

METHOD OF PURGING INK PASSAGES OF AN INK JET RECORDING DEVICE

BACKGROUND OF THE INVENTION

This invention relates to a method of purging the ink passages of an ink jet recording device, especially a device of the type which ejects ink from an outlet towards a recording medium by the use of pressure generated by the sudden decrease of volume of a pressure chamber.

This type of recording device has already become public knowlege as can be noted from, for instance, U.S. Pat. No. 3,946,398 of E. L. Kyser. In these devices, slight differences in liquid pressure and flow resistance arising between the inlet and outlet passages are utilized to eject a drop of printing fluid such as ink and to replenish the pressure chamber. If bubbles or impurities should intermix with the ink in the passages connected with the production of liquid pressure, for example, the ink passages from the ejection orifice to an automatic valve means for controlling the supply of ink to the pressure chamber, or if impurities should stick to the orifice, the normal droplet ejection operation will be impeded, even if the particles are minute. When bubbles are intermixed, some of the pressure generated by the decrease in volume of the pressure chamber is absorbed by the bubbles and the energy to be imparted to the droplet to attain its predetermined speed is lost. Impurities in the passages or attached to the orifice, upon entering into the ejection and inlet passages, destroy the delicate relationship between the two passages as previously stated, which must be maintained for the proper functioning of the device. Such impurities cause change in ejection speed and ejection direction of the ink droplet. Because of these conditions, there arises the necessity of being able to purge the ink passages before the commencement of recording operations and upon the occurrence of the above situations.

SUMMARY OF THE INVENTION

According to the present invention, the pressure required for purging, the value of which is determined by a flow resistance and the other factors due to structure of the device to be employed, a viscosity of ink used with the device and so on, is applied to ink, especially to ink in a ink supply source means a regularly or at special times for purging and then an automatic valve means provided on an ink feeding system to an ink reservoir is opened wide, followed by forming a flow of ink towards an ejection passage from the ink supply source means, whereby the impurities and bubbles which exists in the ink passages of the device are removed together with the discharged ink from the ejection passage.

The present invention further describes a method wherein suction means mentioned in detail below is used in combination with the above mentioned process, whereby better purging effect can be obtained.

It is therefore an object of the present invention to provide a method of purging ink passages of the ink jet recording device of the type which ejects an ink droplet from an orifice to a recording medium by the displacement of volume of ink in a pressure chamber.

It is a further object of the present invention to provide a method of eliminating improper recording of an ink jet recording device by removing bubbles and impurities present in the ink passages or attached to the outer surface near an orifice.

Other objects and advantages of the present ivnention will be apparent from the following description with reference to the accompanying drawings.

BRIEF DESCRIPTION OF THE DRAWINGS

FIG. 7 is a view showing relative positions between an orifice of a printing head and a suction tube edge of a suction means.

FIG. 8 is a view showing relative positions between a suction means and a capping means with respect to a platen of an ink jet recording device.

DETAILED DESCRIPTION OF THE INVENTION

Figure 1:
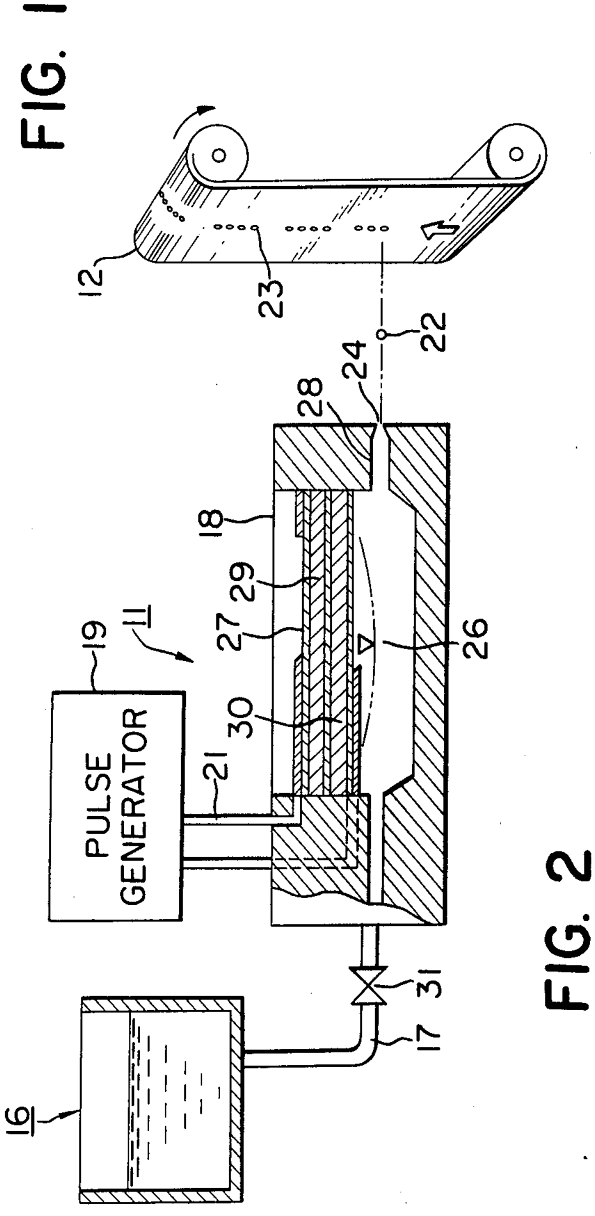
FIG. 1 is a schematic diagram showing an ink jet recording device which is used to illustrate a method of the present invention.

Before the present invention based upon the accompanying drawings below is explained, the recording device which the present invention is premised upon and employs to illustrate its method, will be first explained. FIG. 1 shows the outline of the recording device and its operation. Apparatus 11 is installed to print upon a recording medium 12. Here apparatus 11 (or printing head 18) can be moved relative to recording medium 12, or recording medium 12 relative to apparatus 11 or both 11 and 12 at the same time, depending upon the suitability of the method. Ink supply source 16 is connected to printing head 18 through an ink feeding pipe 17. Electronic pulse generator 19 supplies a pluse by appropriate transmission means 21 such as wire to printing head 18. Flexible plate 27 is appropriately selected to be able to deflect inwardly into pressure chamber 26 upon the reception of an electric signal from electronic pulse generator 19. In the example, plate 27 is shown an assembly of piezoelectric crystals 29, 30 bonded together. The inward deflection of plate 27 is shown by a dotted line in FIG. 1.

Ink droplet 22 is ejected upon the deflection of plate 27 which causes a sudden decrease in volume of pressure chamber 26. This sudden decrease in volume must impart sufficient kinetic energy to the ink in ejection passage 28 so that the ink can accelerate up to ejection speed. This ejection speed is the lowest speed at which the ink plug which will project from orifice 24 upon decrease in volume of pressure chamber 26 will separate from the orifice and form a single discrete droplet. Furthermore, the decrease in volume of pressure chamber 26 must be able to shift an amount of ink greater than the volume of the droplet which will be ejected. This is due to the shift of ink towards ink supply source 16 through ink feeding pipe 17 caused by the decrease in volume.

Furthermore, corresponding to the return of plate 27 to its rest position, the fluid pressure in the pressure chamber will become negative nearly equal in magnitude to the positive pressure occurring during the decrease in volume. This negative fluid pressure reverse the direction of the flow of the ink in ejection passage 28 and promotes the separation of the plug of ink from the orifice and the formation of a discrete droplet of ink.

Thus, upon receiving pulses from generator 19, printing head 18 will, in accordance with the instructions of the pulses eject a discountinuous and necessary number of ink droplets from orifice 24. Droplets 22 follow a substantially straight trajectory and form line 23 on recording medium 12. After a droplet is ejected and plate 27 returns to its normal position, the surface of the ink facing the outside atmosphere in ejection passage 28 is hollow in the shape of a meniscus. This is due to, before head 18 begins operation to eject another droplet, the ink in ejection passage 28 returning to its original state. Capillary forces between the ejection passage and the ink supply the necessary forces to form the meniscus. Depending upon the return rate, a series of discrete droplets can be continuously ejected. Valve 31, provided on ink feeding pipe 17 or the printing head 18, is opened in an automatic manner in response to a pressure drop in an ink reservoir in a manner not shown in the drawing of FIG. 1.

Figure 2:
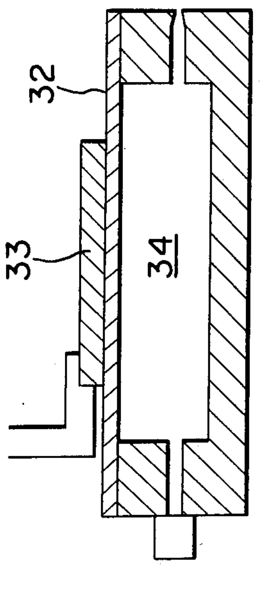
FIG. 2 is a section view of a printing head which is suitable for an ink jet recording device having a plurality of pressure chambers.

FIG. 2 shows a sectional view of another embodiment of a printing head equipped with a plurality of pressure chambers. In the drawing, pressure plate is constructed by two members, coverslip 32 and piezoelectric crystal 33 bonded to the coverslip. Upon putting a voltage across crystal 32, the crystal will contract and cause overslip 32 (namely, the plate) to deflect into the pressure chamber 34. Consequently, if this construction is chosen, a single broad coverslip is used to cover the top of a plurality of aligned pressure chambers 34. In addition, a crystal is simply bonded over each pressure chamber and printing head. A plurality of pressure chambers can thus be made easily.

Figure 3:
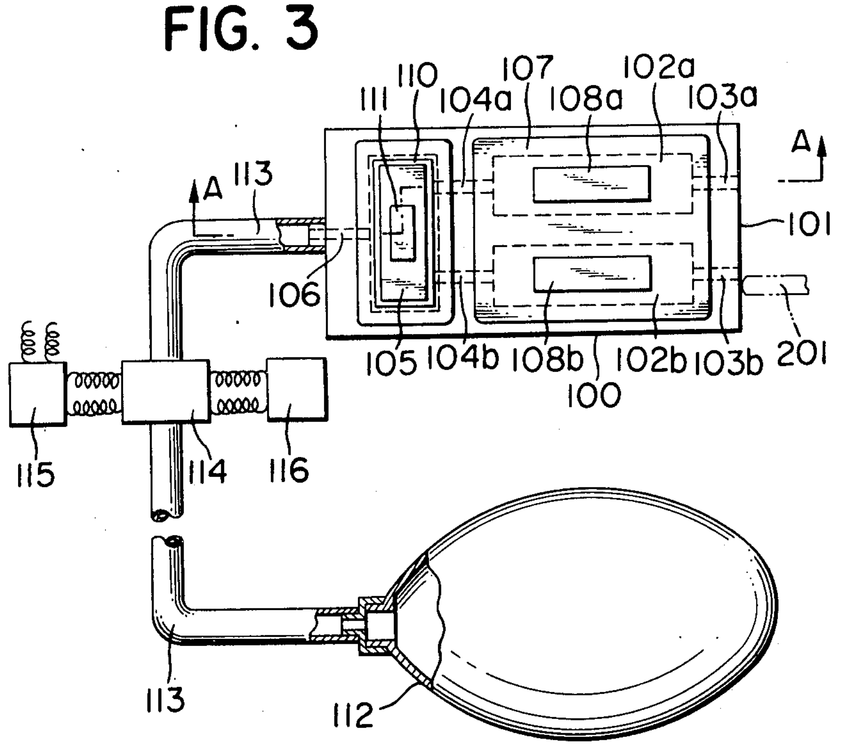
FIG. 3 is a schematic diagram of one embodiment of the present invention wherein the ink jet printing device has a plurality of pressure chambers and an elastic ballon as an ink supply source is shown.
Figure 4:
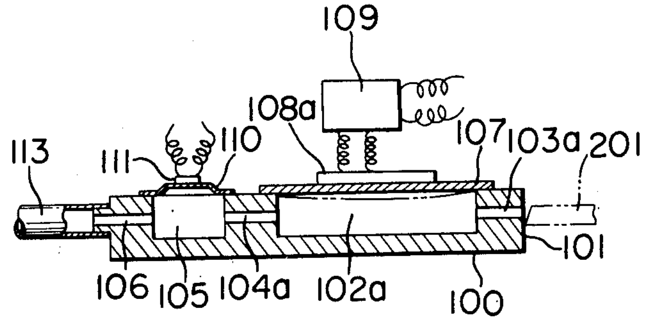
FIG. 4 is a sectional view taken at A—A of FIG. 3.

FIGS. 3 and 4 show an embodiment of the apparatus which uses a printing head with a plurality of pressure chambers made as stated above. A printing head 100 is constructed so that by an appropriate method the head can be shifted in both directions (in FIG. 3, the directions perpendicular to the plane of the paper) at high speed while maintaining a fixed ejection distance from the recording medium (not shown). Within the printing head, there are a plurality of pressure chambers *102a* and *102b*, outlet passages *103a* and *103b*, inlet passages *104a* and *104b*, and ink reservoir 105 and a connecting passage 106. Pressure chambers *102a* and *102b* may be arranged to form an array aligned perpendicularly to the movement of the printing head. To properly form all alphanumeric characters, seven pressure chambers are actually required, but for the sake of simplicity only two chambers are shown in the drawings. Coverslip 107 and piezoelectric crystals *108a, b* constitute the upper wall of pressure chambers *102a, b*. With these three pieces, two assemblies of pressure plates are formed and function as stated in the foregoing. Pressure plate 107, crystal *108a* and pressure plate 107, crystal *108b*, are constructed so as to deflect respectively upon the incomming of an electrical signal. A pressure control board 110 which is elastic and is the upper covering of ink reservoir 105 is made so as to be able to rise or fall according to the amount of ink in the reservoir. The pressure control board need not be flexible and a leak-proof construction where the front or just the top surface of the reservoir moves may be used.

A liquid pressure detection means 111 is attached to the top surface of pressure control board 110. It detects the liquid pressure of reservoir 105 over the width of its fluctuations, i.e., from states of low pressure to those of high. For high pressures, it is necessary, minimally, to maintain pressure within a range such that the droplet can be properly ejected upon the decrease in volume of the pressure chamber. Likewise, at low pressures, such pressures where normal ejecting of droplets is impaired must be avoided. Elastic balloon receptacle 112 for supply fresh ink to the printing head is set up so that the action of the shrinkage of the balloon confers a fixed pressure (for example, 0.6–0.1 kg/cm$^2$) to the ink within the receptacle. Synthetic resin pipe 113 connects connecting passage 106 to balloon receptacle 112. Midway along the length of pipe 113 is installed automatic valve means 114 which is constructed so as to open and close ordinarily (i.e., during the printing operation) upon an operational signal applied from appropriate automatic valve operation means 115. Upon reception of a signal of low pressure from liquid pressure detector means 111, automatic valve operation means 115 gives a signal to "open" to automatic valve means 114, and upon reception of a signal of high pressure from detector 111, automatic valve operation means 115 gives a signal to "close" to automatic valve means 114. Flush operation means 116 generates operational signals to open wide automatic valve means 114. Flush operation means 116 is constructed so that even while automatic valve means 114 is being controlled by automatic valve operation means 115, an operational signal from flush operation means 116 will cause automatic valve 114 to open. Alternatively, automatic valve operational means 115 and flush operation means 116 can be constructed so that by a switching mechanism means either can be selectively coupled to automatic valve 114 and both means of operation can be used. Finally, a special valve can be used for automatic valve means 114 so that without using flush operation means 116, valve means 114 will automatically shift to an "open" state just upon the suspension of the operation of automatic valve operation means 115. Furthermore, for this flush operation of opening and closing automatic valve 114, either electrical or mechanical means are acceptable.

The ink passages of this apparatus, i.e., the passages from the balloon receptacle's outlet to the ejection passages *103a* and *103b* of printing head 100 can be selected so that their cross-sections may be of circular, elliptical, square or rectangular shapes. This option also includes the orifices of ejection passages *103a, b*.

There is known the action occurring with the ejection of a droplet from ejection passages *103a, b* during the printing operation and the movement of the ink supplied to pressure chambers *102a, b*. Also known is the function of the supply of new ink into ink reservoir 103 from balloon receptacle 112 upon the opening of automatic valve means 114 triggered by the state of low pressure in the reservoir when the amount of ink in ink reservoir is diminished and the closing of automatic valve means 114 when the pressure in the ink reservoir is high. Thus the explanation here is somewhat abridged.

The following concerns purging and the time for its occurrence. That purging should be performed in the first step of a day of recording operations is expected. However, purging is not limited to this time only. Purging can be performed prior to the beginning of any recording operation or upon the discovery of an improper droplet ejection condition, or perhaps upon the completion of our printing operation and before the beginning of the next. Whichever the case may be, the purging operation itself remains the same. A cap (which not only prevents bubbles and impurities from entering the ejection passages and impurities from sticking to the head face 101 of printing head 100, but also insures the appropriate state of moisture for head face 101 which covers each outlet passage 103*a, b* is first removed, then by the engagement of flush operation means 116, automatic valve means 114 is opened wide. Since the ink in balloon receptacle 112 is already under pressure from the elastic compression force of the balloon, ink is forced through the ink passages and out from ejection passages 103*a, b* upon the opening of automatic valve means 114. Depending upon the speed of the ink flow and the existence of impurities adhering to the orifice, the length of time for purging will change. But in any case, all bubbles and impurities in the ink passages and impurities adhering to the ejection orifice will be removed by the purging operation. After completion of the purging operation, flush operation means 116 is disengaged and automatic valve means 114 is returned to its normal mode of operation.

For large impurities, filter means (not shown in the drawings) may be installed at the outlet of balloon receptacle 112 or near it or such means may be placed at appropriate locations in connecting pipe 113 or at the inlet passage of printing head 100 and so on. Such filter means may be fixed or replaceable. A suitable device can catch all the unwanted ink discharged from the outlet passages during purging and then be disposed of. After the purging operation, one can depend upon the passage at time for the ink in ejection passages 103*a, b* to naturally return to their normal meniscus shape if the viscosity of the ink and other factors have not changed greatly, or one can cause the head to fire droplets of ink one or two times to help the return.

Figure 5:
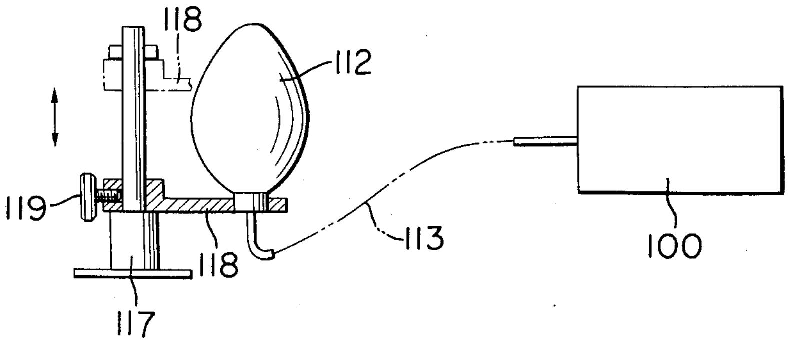
FIG. 5 is a schematic diagram showing another type of the ink supply source means in which a pressure to ink is applied by a potential energy of the ink in the ink supply source means.

FIG. 5 shows another means of putting ink under pressure during purging. The shape of the shell of container 112 may be fixed. In case of the container of the fixed shape, the pressure required for normal printing operations is put upon the ink to be supplied, namely, the pressure required to cause the ink to flow into the ink reservoir upon the opening of automatic valve means 114 triggered by the dimished amount of ink in the reservoir is supplied by the water head pressure (potential energy) of the position of container 112 with respect to printing head 100. Sliding support 118 holding container 112 is mounted by clamp screw 119 upon support 117 which is fixed to a stationary part of the recording device. During normal printing operations, sliding support 118 is placed at a position (marked in solid lines) which yields a previously determined liquid head pressure. During purging, sliding support 118 is caused to move upward to the position indicated by the dotted lines to obtain a high liquid head pressure. The flush operation means is then engaged and automatic valve means is opened. Thus the ink is flowed out through the ink passages at a pressure high enough for purging.

Of course, it can be apparently understood that this technique can be applied to the previous balloon reservoir 112. However, besides the synergistic effect of purging capability, the combined use of the pressure imparted by the elastic balloon and the high liquid head pressure may have other effects, such as the complete consumption of the ink in the container only by the high liquid head pressure when the elastic action of the container may not be of superior quality.

Figure 6:
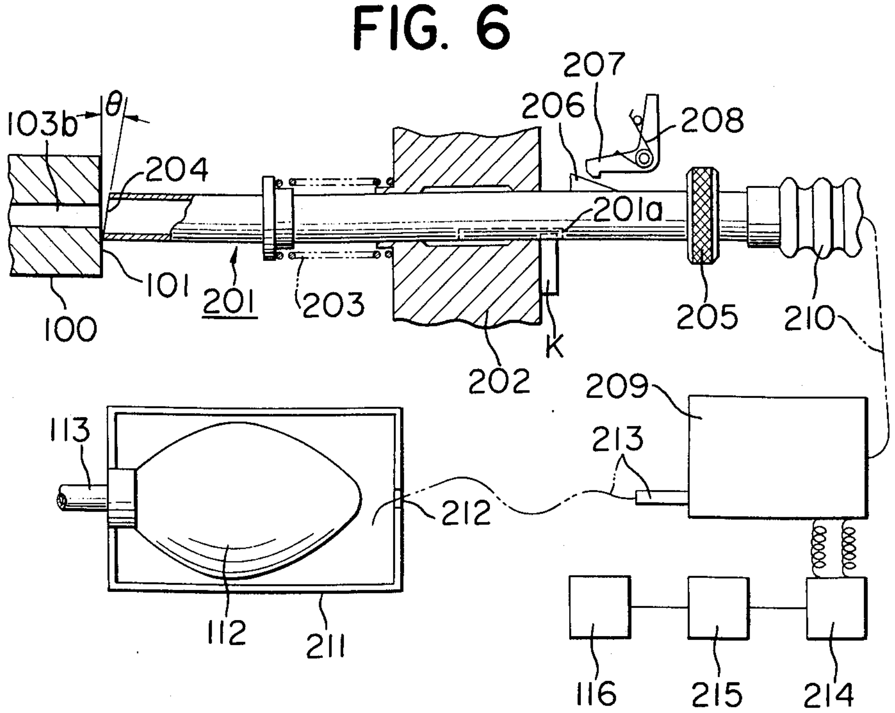
FIG. 6 is a schematic diagram of a suction means in accordance with the present invention.

Next, one embodiment of the invention wherein an ink suction means is used together with the purging of the ink passages as stated in the foregoing will be explained. In FIG. 6, suction tube 201 with a hollow cross-section much greater than that outlet passages 103*a, b* may be fixed to the recording device. Alternatively, suction tube 201 may slidably be engaged to a supporting member 202 by the use of key slot 201*a* in a suction tube 201 and a key K, and may normally be loaded in a leftward direction with weak spring 202. As shown in the drawing, the left edge 204 of suction tube 201 and head face 101 of printing head 100 are in contact with each other at a slope angle of $\theta$ degrees. As a principle, the direction or bias in which this slope angle faces is made in the direction in which the printing head moves (including the opposite direction) or in the line in which the outlet passages 103*a* and 103*b* are aligned (including the opposite direction). However, depending upon blower 209 which will be mentioned hereinlater, the conditions of moisture of printing head face 101, the viscosity of the ink, the speed and amount of ejected droplets, the cross-sectional area of the ejection passages, the shape of the cross-section of suction tube 201 and so forth, the slope is set in various directions. Consequently, it is convenient to construct suction tube 201 and support member 202 so that, for example, with key K attached to support member 202 as a pivoting mount so that a suction tube 201 can be rotated (along its length). The direction of slope angle $\theta$ can be adjusted for purging. Angle $\theta$ can be obtained by cutting edge 204 of tube 201 at $\theta$ degrees if the direction of sliding action of suction tube 201 is perpendicular to head face 101 by setting the angle at which suction tube 201 itself slides toward printing head face 101 so that edge 204 and printing head face 101 form $\theta$ degrees. Since the value of $\theta$ depends a great deal upon the effectiveness of the blower mentioned below, it is convenient to compensate for variations in the particular blower used and other factors by changes in slope angle $\theta$. In the above, the changes in slope angle $\theta$ may be given by a pivotal movement of the suction tube 201 with respect to the contact point of the head face and the suction tube and the pivotal movement of the suction tube 201 in turn may be provided by, the example, the shift of the supporting member 202. Forming part of suction tube 201 are knob 205 and catch 206. Hook lever 207 bent in the middle and mounted on a pivot there, is loaded in a counterclockwise direction by spring 208. When suction tube 201 moves to the right, lever 207 engages catch 206 to maintain the suction tube 201 in that position. In case suction tube 201 is constructed so as to be able to rotate (along its length) with respect to support member 202, catch 206 should be extended completely around suction tube 201 to form a catch ring. Alternatively, hook lever 207 should be mounted to the same base as key K so that lever will rotate along with the suction tube's rotation. Blower 209 may be a fan or a centrifugal type. In place of a blower, a pump may also be used. The blower or pump's strength is chosen at the time of the design of the apparatus after careful consideration of the relation between the speed of ink flow within the ink passages, the cross-sectional area of the outlet passages, the cross-sectional area of the suction tube, slope angle $\theta$, the time set for the purging operation, the amount of electric power which may be used, and so forth. Elastic or flexible connecting pipe 210 connects the right edge of suction pipe 201 with blower 209. Cylindrical shell 211 tightly encloses balloon container 112 on all sides and on the top of the cylindrical shell on its axis then is ventilation hole 212. Discharge pipe 213 leads from blower 209 to ventilation hole 212. Timing regulator means 215 controls the timing between the operation of blower operation means 214 and flush operation means 116 for automatic valve means 114. Timing regulator means 215 regulates both the timing of the complete opening of automatic valve means 114 by flush operation means 116 with the activation of blower 209 by blower suction operation means 214 and the timing when flush operation means 116 is not operated and automatic valve 114 is operating normally with the deactivation of blower 209.

The position of suction tube 201 in relation to printing head 100 and the platen (the printing limits), as well the relative position of the capping means, is as follows.

The positions which suction tube 201 may assume with respect to head 100 are various. Some of these formulations are shown in FIG. 7. The formulation shown in FIG. 7(a) is probably most commonly considered with a single suction tube in contact with the lowest outlet passage **103*b*. There, both ink which emerges from the lowest outlet passage 103*b* and ink which attached to the head face 101 after emerging from the upper outlet passage 103*a* are sucked up by the suction tube 201. In this formulation, hollow suction tube 201 can cover outlet passage 103*b* partially (FIG. 7(a)) or cover outlet passage 103*b* completely (FIG. 7(b)). Which formulation should be chosen is a problem related to the plan constraints of the recording device. In the present case, if the automatic valve means is opened wide much earlier than blower 209 is operated, ink emerging from upper ejection passages 103*a* will needlessly dirty head face 101. On the other hand, if the suction operation is started excessively early before the wide opening of automatic valve means, some of the ink in pressure chamber 102*a* will be sucked out from bottom most ejection passage 103*b* through ink reservoir 105, which results in causing air forming bubbles and impurities to enter ejection passages 103*a* and, further, inviting a disruption of the normal distribution of ink within printing head 100, after the completion of purging. Consequently, when this particular formulation is used, these points must be carefully taken to the consideration and timing means 215** must be set appropriately.

The embodiment shown in FIG. 7(c) is a variation in the cross-sectional shape of the suction tube which is effective to the case where the amount of ink attached to a head face 101 is relatively large, the case where a suction force per an unit cross section area must be reduced by increasing a total cross section area of tube edge 204 upon employing the blower having a extremely large suction capacity owing to unavoidable circumstances, and so forth. While the amount of the suction force can be varied by changing the value of slope angle $\theta$, if such the change is not possible, this embodiment is still effective. Furthermore, a combination of the embodiment and the controlling of the amount of angle $\theta$ can also be considered.

FIG. 7(d) shows an embodiment with a plurality of suction tubes. It is effective when the suction of the bottom most ejection passage **103*b* only is not adequate, namely, when the amount of ink emerging from the ejection passages during purging can not be handled by only one suction tube when the use of only one suction tube creates a pressure imbalance or when ink which emerges from the upper outlet 103*a*** is needlessly attached to the head face and dirty there. In place of a plurality of suction tubes, it is possible to use one tube which is divided at its forward section into a plurality of suction tube tips. There is no necessity for each outlet passage to have a corresponding tube. Correspondence may be made with only those outlet passages for which a suction tube is necessary. With regard to the amount of slope angle $\theta$ and respective direction or bias, each suction tube or each suction tip divided from the main tube may be different or may be identical.

Furthermore, for all of the above embodiments, great importance must be placed upon the relationship between the time of the beginning and the end of the suction operation and the time of the beginning and the close of the flush operation of automatic valve means 114. Since as a principle the ink purging operation is performed before the beginning of the printing operation as stated previously, it is required that the ink in printing head 100 must be in a state ready for printing after the end of purging. Since the condition of the ink surface of the ink in ejection passages **103*a* and 103*b* and the condition of ink reservoir 105 must match the conditions of a proper droplet ejection, an aim of the present invention, the timing between the end of the flush operation of automatic valve means 114 (i.e., the return of automatic valve means to a normal operation state) and the end of the operation of blower operation, is the delicate problem. As a principle the operation of blower 209 should terminate after the end of the flush operation of automatic valve means 114. This is due to that after valve means 114 is shut, only a very small amount of ink in ejection passages 103*a* and 103*b* should be sucked out and nearly all of the ink on printing head face 101 should be removed. If the amount of ink sucked away is great, the pressure in ink reservoir 105 will drop too low and the replenishment of ink will begin by the normal action of the automatic valve means 104**. Namely, since the excess suction causes return to purging condition, a proper attention must be paid to avoid the excess suction.

The state of moisture of the printing head face 101 also delicately influences the ink droplet ejection operation. The maintenance of proper conditions must be carefully watched. An ink droplet is formed by the separation from the ink plug projecting from ejection passages **103*a*, *b* of some of the ink. By this separation and the return of the remaining ink plug to ejection passages 103*a*, *b*, there appears a phenomenon that a minute amount of ink is left near the orifice. This influences the state of moisture of the head face 101 and this, in turn, affects the droplet ejection speed and direction. However, the moisture of the printing head face 101 causes dust and the like in the surrounding air to stick to face 101. In an environment where dust comparatively plentiful, there arises the need to remove moisture from the print head face 101** to keep it in a nearly dry state. Whichever condition is to be maintained is a matter to be decided on with the condition of the recording device in mind during planning.

Up to now, the suction means has been explained as being attached to a stationary part of the device, but it is possible to attach such means to the printing head 100.

In this case, the printing head body will become larger and high speed printing ability will be affected somewhat. Furthermore, as stated below the distance between the printing head and the recording means will become smaller. Therefore, the construction of the suction apparatus will be different more or less. For example, when a part suitable as suction tube 201 is fitted to the printing head 100, its tip must be shaped flat for print face 101 so as not to cause any interference with the normal movement of the head during printing. Naturally, the parts connected from intermediary pipe 210 and below are made to lead from the printing head 100 to the stationary part of the apparatus. It is important to keep the mass of the printing head low.

Next, the position of suction tube 201 in relationship to the platen (the spatial limits of the printing operation) and to the relative position of the capping means will be explained, but first a short outline of the capping operation will be made. The principle of droplet ejection upon which the present invention is based is that by the generation of liquid pressure caused by the decrease in volume of the pressure chamber an ink droplet is discharged. The ejection energy of the ink droplet is not very great and consequently the distance between printing head 101 and the recording means can not be very large. Furthermore, by keeping the mass of the printing head low, a high speed printing mode can be achieved. Thus, due to the movement of the printing head, if the inertia of the ink droplet becomes large, the accuracy of the droplets for character formation is adversely affected, again implying that the distance between the printing head and the recording means can not be great. On the other hand, due to this manner of liquid pressure generation by the decrease of the volume of a pressure chamber, ink within the printing head tends to flow out at very slight movements of the the printing head. When the printing head is subjected to heat, vibrations and so on, for example, ink will flow out. This also badly affects the condition of moistness for the printing head face. Furthermore, since even minute amounts of dust and so forth adhering to the printing head face will badly affect droplet ejection accuracy, restrictions upon the determination of the capping operation increase because of the previously stated printing head-recording medium-distance problem, along with problems stated immadiately above.

It is extremely difficult to use ordinary means of capping among the various types of recording devices. For the recording apparatus used to illustrate the present invention, a special type of capping means is used. Namely, at any time not during the printing operation, printing head 100 is moved to a position off the platen where the head is then capped.

However, as stated previously, the conditions of moistness of printing head face 101 is to be carefully considered. This point must also be attended to for the capping operation. Some important considerations are:

(1) During capping relative slippage between the cap member and the printing head face should be avoided.

(2) To prevent ink from flowing out of the ejection passages even if the printing head is subjected to heat or vibration, the cap member is to be pressed against the printing head face with appropriate pressure.

(3) For each capping operation, the part of the cap member which is to be in contact with the printing head face ought to be a fresh surface or a freshly cleaned one to avoid variations in the conditions of moisture of the printing head face.

(4) The capping operation must be simple and precise.

For these reasons, the capping means for this invention ought to be constructed as follows:

(1) Upon return to the capping position, the printing head should be capped with a motion which avoids lateral slippage (for example, relative movement between the cap and printing head face in a straight line or a large circular are) and capping should be made with a predetermined pressure against the printing head face.

(2) Removal of the cap from the printing head face should be made in a similar manner.

(3) For each capping operation, the member to be in contact with the printing head face must be fresh or freshly cleaned and coupled with a mechanism which directs it toward the printing head face. For example, capping means with a single cap member can be constructed such that with a moveable disk (or belt) as a cap member coupled to an appropriate mechanism the part of the cap member in contact with the printing head face shifts with respect to the head face either before contact is made or upon removal of the cap from the head face. Thus at the next capping operation a different part of the capping part of the contact member always contacts with the printing face. Alternatively, as in an ordinary typewriter, a ribbon mechanism can be installed in the capping means. Each time a capping operation is made; a fresh part of the ribbon is moved to face the printing head face. The ribbon is immediately in front of the head face and a pressure member, which is behined the ribbon and can move back and forth in a direction perpendicular to the head face moves forward to press the fresh part of the ribbon against the head face to complete the capping. Naturally, for a capping means with a single cap member, there is the necessity for a good cleaning of the cap member upon its removal from contact with the printing head face. Thus, if a disk is used, a scraper blade or a cleaning brush should be set either perpendicular to or at a somewhat inclined angle (for example 10° to 30°) to the lateral face of the disk to remove any material adhering to the face. The combined use of scraper blade and brush is particularly effective.

FIG. 8 shows the relative positions between the capping means, suction means, and platen. Guide rail 217 for printing head 101 is set parallel to the lateral face of platen 216 around which a recording medium is wound. Printing head 100 can be shifted along guide rail 217 to a selected position by an appropriate drive means (for example, a belt-pulley combination) in a stepwise or continuous fashion. Limitation blocks 218 and 219 support guide rail 217 and limit the movement of printing head 100. Cap member 220 is constructed so as to be able to move to and from the guide rail (the vertical direction as shown in the diagram). A cap member 221 has the ribbon itself passing close to and parallel to the guide rail and the cap member is able to move to and from the guide rail.

FIG. 8(*a*), (*b*) show an embodiment where suction tube 201 and cap member 220 (or 221) are placed to one side of platen 216. In FIG. 8(*a*), when printing is not being carried out, printing head 101 is in a position before cap member 220 and the cap member will be pressed against printing head face 101 by appropriate spring pressure. Upon purging of the ink passages before the beginning of the printing operation, cap member 220 first withdraws (upward in the drawings) away from printing head face 101 and then printing head 100 moves to the left extreme in front of suction tube 201. Suction tube 201 then causes in contact with printing head 101 and the purging operation begins. Upon completion of purging suction tube 201 return to its original position and printing head 100 moves in front of the platen. Until the completion of printing the printing head will move back and forth in front of the platen's face. Actual printing may occur only when the printing head moves left to right or may be performed when the head is also moving in the return direction. The purging position is against the left limitation block. This ensures accuracy of contact between printing head face 101 and suction tube 201.

The operation for FIG. 8(*b*) is nearly identical to thatabove. The positions for the capping and purging operations have been interchanged to reflect the order in which the various operations are carried out.

In FIG. 8(*a*), capping means and purging means are placed an opposite sides of platen 216. For this method of operation, the printing operation is directly entered into after cap member 220 is withdrawn from its capping position. Ordnarily the head remains in front of the platen for printing but when purging becomes necessary, printing head 100 moves the position abutting right limitation block 219 when purging of the ink passages is performed. Naturally the position of capping means and purging means may be interchanged. After capping member 220 is withdrawn, printing head 100 may be moved to a position before suction tube 201 for purging. After that, for a period of one to several days, printing operations simply begin directly after a purging operation only, without any capping.

For both embodiments shown in FIG. 8(*a*), (*b*), it is possible to combine operations and the operation order with the printing operation into one single program routine. However, it is also possible to use such unified program for normal operations, but to supplement it with a means of cancelling various parts singly and at will as necessary.

With the use of a suction means during purging, automatic valve means is opened wide and the operation of blower 209 begins after suction tube 201 is brought into contact with printing head face 101. Upon the return of suction tube 201 to its original position, the purging operation is completed. But there remains the problem of setting of the correct timing between the operation of the flush operation means 116 and suction means 214 for the proper formation of a meniscus for the ink surface in ejection passages 103*a*, *b* and the maintenance of proper moisture conditions for printing head face 181. At a present day, with electronic control techniques it is a simple matter to electrically program the above operations in a proper sequence. Thus, concerning a practical explanation of the above techniques, only the purposes of the techniques are mentioned. No details are mentioned.

In addition, it is possible to show how attain a sequential activation of the capping means, the coupling and uncoupling of the capping and purging operations, the coupling and uncoupling of these operations with the movement of the printing head over the platen during the printing operation, and so forth by electronic techniques. However, the practical and individual details of these are not explained here. Moreover, since from public and widely known knowledge, it is easy to achieve the mechanical construction of the suction, capping, and automatic valve means, detailed explanations of such constructions are also omitted.

Finally, protective shell 211 receives the unwanted ink sucked out by the action of blower 209. Balloon receptacle 112 and protective shell 211 are constructed for interchangeability so that the balloon receptacle and its protective shell are joined together to pipe 113, which supplies new ink to the apparatus, by means of a hollow needle through the shell material, for example. By using the large empty space between the outside wall of the balloon receptacle and the inner wall of the shell, the unwanted ink can be removed with the discard of the balloon receptacle after it is used up.

As shown above, the present invention offers a novel method of purging the ink passages used in various apparatus.

What is claimed is:

1. A method of purging ink passages of an ink jet recording device which includes at least one pressure chamber having an outlet passage which terminates at an orifice of a nozzle face of a printing head, an ink reservoir communicating with an inlet passage of said pressure chamber, an ink supply source means for feeding fresh ink to said ink reservoir, and an automatic valve for controlling the flow of ink from said ink supply source means to said ink reservoir, some of the ink in said pressure chamber being ejected from said orifice towards a recording medium by the sudden decrease in volume of said pressure chamber while some of the other ink flows back towards said inlet passage, the ink of said ink reservoir being caused to flow into said pressure chamber by the difference in pressure between said outlet passage and said inlet passage of the pressure chamber, which is generated upon the return of said pressure chamber to its original volume, and in addition fresh ink in said ink supply source means being fed towards said ink reservoir by causing said automatic valve to open when the ink in said ink reservoir is below a predetermined amount, comprising the steps of:

(a) applying pressure required for purging to the ink in said ink supply source means at least upon purging operations, (b) causing said automatic valve to open wide, and (c) allowing ink to flow from said ink supply source means to said orifice, thereby to remove bubbles and impurities present in the ink passages together with the ink flowing out.

2. A method according to claim 1 wherein the application of pressure to the ink in said ink supply source means is carried out by the use of a means for increasing a liquid pressure which can be actuated at least upon purging operations.

3. A method according to claim 1 wherein said ink supply source means is a container comprising an elastic balloon enclosing the ink to be supplied, which, at the same time, functions as a means for increasing a liquid pressure.

4. A method of purging ink passages of an ink jet recording device which includes at least one pressure chamber having an outlet passage which terminates at an orifice of a nozzle face of a printing head, an ink reservoir communicating with an inlet passage of said pressure chamber, an ink supply source means for feeding fresh ink to said ink reservoir, and an automatic valve for controlling the flow of ink from said ink supply source means to said ink reservoir, some of the ink in said pressure chamber being ejected from said orifice towards a recording medium by the sudden decrease in volume of said pressure chamber while some of the other ink flows back towards said inlet passage, the ink of said ink reservoir being caused to flow into said pressure chamber by the difference in pressure between said outlet passage and said inlet passage of the pressure chamber, which is generated upon the return of said pressure chamber to its original volume, and in addition fresh ink in said ink supply source means being fed towards said ink reservoir by causing said automatic valve to open when the ink in said ink reservoir is below a predetermined amount, comprising the steps of:

(a) applying pressure required for purging to the ink in said ink supply source means at least upon purging operations,
(b) causing said automatic valve to open wide,
(c) allowing ink to flow from said ink supply source means to said orifice, thereby to remove bubbles and impurities present in the ink passages together with the ink flowing out,
(d) placing said printing head in a position where the nozzle face of the printing head and a suction means are able to be in contact with each other,
(e) actuating said suction means while said nozzle face and said suction means are in contact with each other, whereby the suction force thereof promotes a flow of ink from said ink supply source means to said orifice along with a liquid pressure applied and both the ink emerging from said orifice and the ink in said outlet passage are sucked up in a suction tube of said suction means,
(f) returning said automatic valve to its automatic mode of operation after a predetermined period of time,
(g) sucking up a small part of the ink in the ink passages between said automatic valve and said orifice by the action of only said suction means, and
(h) removing said suction tube and said nozzle face from each other while the sucking operation of said suction means being continued, whereby no ink remains on said nozzle face of the printing head.

5. A method according to claim 4 wherein the application of pressure to the ink in said ink supply source means is carried out by the use of a means for increasing a liquid pressure which can be actuated at least upon purging operations.

6. A method according to claim 4 wherein said ink supply source means is a container comprising an elastic balloon enclosing the ink to be supplied, which, at the same time, functions as a means for increasing a liquid pressure.

7. A method according to claim 4 wherein said suction means contains a plurality of suction tubes.

8. A method according to claim 4 wherein a suction tube edge of said suction means and said nozzle face of the printing head are in contact with each other at a slope angle.

9. A method according to claim 8 wherein said suction tube edge is of the shape which has a slope angle with respect to a plane perpendicular to the longitudinal direction of the suction tube.

10. A method according to claim 4 wherein the step of causing said automatic valve to open wide is carried out by the use of a flush operation means which forces the automatic valve to open even while the automatic valve operation means gives a signal "close" thereto.

11. A method according to claim 10 wherein said flush operation means is connected to a means for controlling the timing between the sucking operation of said suction means and the valve opening operation of said flush operation means.

12. A method of purging ink passages of an ink jet recording device which includes at least one pressure chamber having an outlet passage which terminates at an orifice of a nozzle face of a printing head, an ink reservoir communicating with an inlet passage of said pressure chamber, an ink supply source means for feeding fresh ink to said ink reservoir, and an automatic valve for controlling the flow of ink from said ink supply source means to said ink reservoir, some of the ink in said pressure chamber being ejected from said orifice towards a recording medium by the sudden decrease in volume of said pressure chamber while some of the other ink flows back towards said inlet passage, the ink of said ink reservoir being caused to flow into said pressure chamber by the difference in pressure between said outlet passage and said inlet passage of the pressure chamber, which is generated upon the return of said pressure chamber to its original volume, and in addition fresh ink in said ink supply source means being fed towards said ink reservoir by causing said automatic valve to open when the ink in said ink reservoir is below a predetermined amount, comprising the steps of:

(a) applying pressure required for purging to the ink in said ink supply source means at least upon purging operations,
(b) causing said automatic valve to open wide independent of the amount of ink in said reservoir, and
(c) allowing ink to flow from said ink supply source means to said orifice, thereby to remove bubbles and impurities present in the ink passages together with the ink flowing out.

13. In an ink jet printer comprising a plurality of ink pressure chambers, each chamber having a separate valveless outlet passage and means individually controllable for suddenly reducing the volume of the chamber upon receipt of an individual electrical pulse to eject an ink droplet on demand from its outlet passage, a common ink reservoir in constant fluid communication with each of said chambers to supply ink thereto, ink being driven back into the reservoir from a chamber upon actuation of its volume reduction means simultaneously with ejecting an ink droplet from its outlet, an ink supply connected through an ink supply valve to said reservoir, means associated with said reservoir for measuring ink volume and/or pressure therein, electronic means responsive to said measuring means for opening said ink supply valve upon the ink within the reservoir falling below a certain minimum threshold and for closing said valve when the ink is above a certain upper threshold, said ink supply storing ink under a steady state pressure, whereby the volume and/or pressure of ink within said reservoir is automatically maintained between set limits, a system for purging ink therefrom, comprising:

means for causing said ink supply valve to open for a predetermined time period independently of the operation of said electronic means, and
means for simultaneously and temporarily during said predetermined time period increasing the pressure of said ink supply above said steady state pressure, thereby to purge ink through each of the plurality of chambers and out their respective outlet passages, whereby bubbles and impurities are also removed.

14. The improved ink jet printer according to claim 13 which additionally comprises means for applying a suction to an outside termination of the outlet passages of said plurality of chambers during said predetermined time period and for a time after, whereby ink purging is facilitated and any excess ink after purging is removed from the print head.

* * * * *